July 28, 1931.  S. G. DOWN  1,816,076
BRAKE EXPANSION TUBE
Filed Jan. 10, 1929
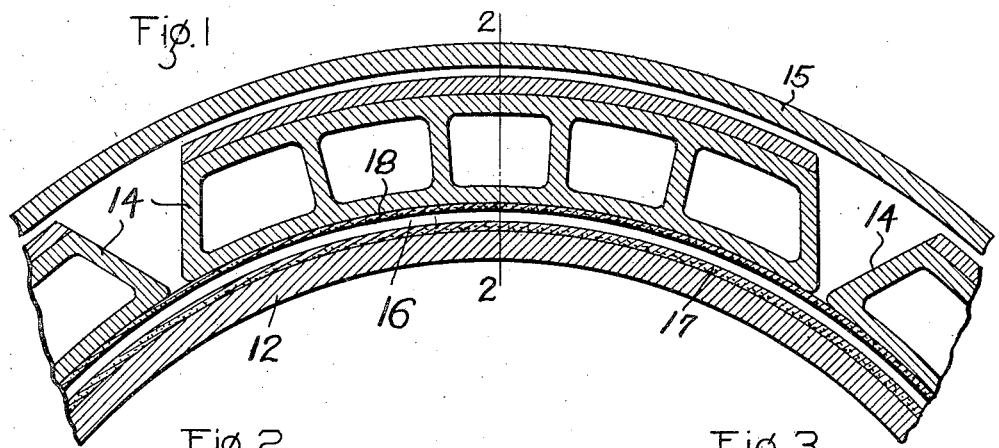
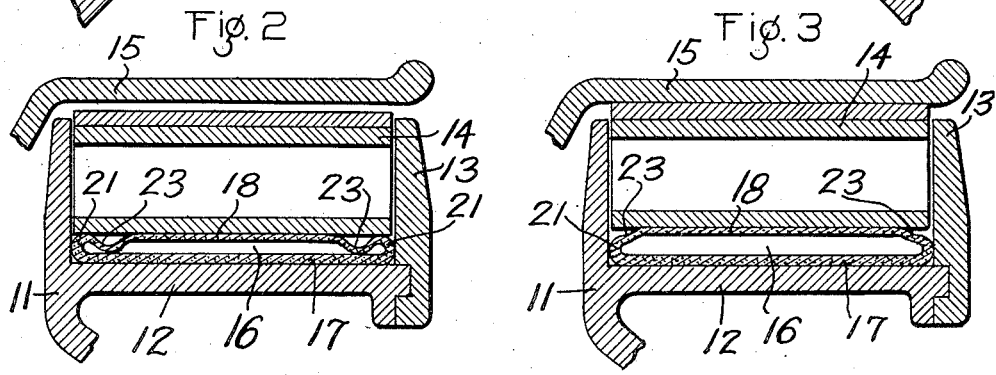
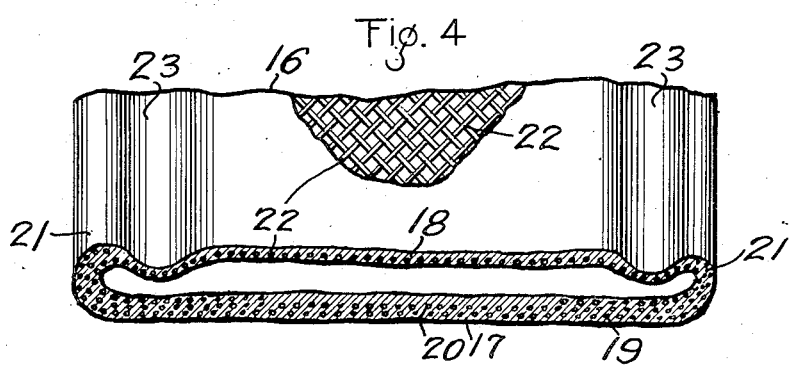
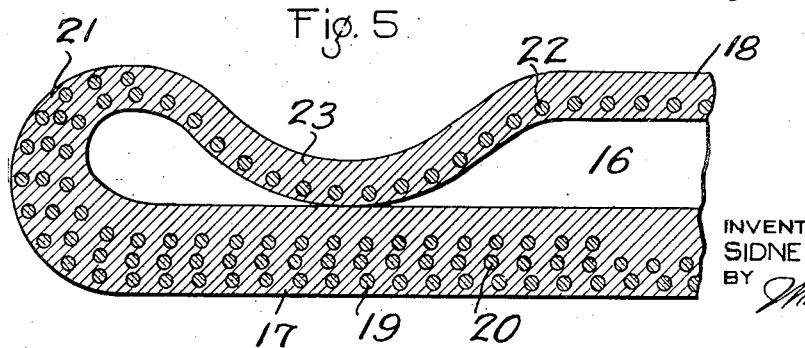
INVENTOR
SIDNEY G. DOWN
BY Wm. M. Cady
ATTORNEY Patented July 28, 1931

1,816,076

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE EXPANSION TUBE

Application filed January 10, 1929. Serial No. 331,581.

This invention relates to brakes for automotive vehicles of the type in which each one of any desired number of vehicle wheels have a brake drum, and within each brake drum there are a plurality of radially arranged segments or shoes which are operatively carried by a suitable support secured to the vehicle and are movable into or out of operative engagement with the interior braking surface of the brake drum by means of an inflatable or expansible actuator that is interposed between the brake support and the shoes.

An object of the invention is to provide a brake apparatus of the character mentioned with an improved type of actuator.

Another object of the invention is to provide a vehicle brake actuator of the character mentioned in which great flexibility and expansibility is obtained.

Another object of the invention is to provide a brake shoe expander in the form of a tube having opposed walls, one of which is more flexible than the other.

Another object of the invention is to provide a tube for brake apparatus of the character mentioned in which one of the walls of the tube is formed with circumferential corrugations.

Another object of the invention is to provide a tube for brake apparatus of the character mentioned which is formed from a suitable rubber composition that is reinforced by a plurality of plies of fabric in the form of sheets of open mesh material extending transversely of the walls of the tube and so embedded therein in overlapped relation as to strengthen the tube at its weakest points.

Another object of the invention is to provide a brake expansion tube of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings: Figure 1 is a vertical longitudinal section through a portion of an automotive brake, showing the application of my invention thereto; Fig. 2 is a vertical transverse section taken on the line 2—2 of Fig. 1, the tube being shown collapsed; Fig. 3 is a view similar to Fig. 2, showing the tube expanded and the shoe engaging the brake drum; Fig. 4 is a detail view of a portion of the tube, a part being broken away to show the reinforcing means; and Fig. 5 is an enlarged detail section of a portion of the tube.

Referring to the drawings, the brake shoe support may comprise a channel formed from a vertically disposed non-rotating web 11 which may be carried by, and extend from the vehicle axle housing (not shown), said web 11 being formed with a substantially horizontal flange 12 to the free edge of which there is mounted a ring 13.

Brake shoes 14, of any desired type and construction, are radially arranged around the channel and are adapted to be moved outwardly and inwardly relative to a rotatable brake drum 15 carried by the vehicle wheel, to respectively apply and release the brake.

In the present instance, the brake shoe expander is shown as comprising an annular tube 16 which is interposed between the brake shoes 14 and the flange 12, said tube having a width to snugly fit between the side walls of the said channel. The tube 16 is adapted to be inflated or expanded by fluid pressure from any suitable source (not shown), and when being inflated or expanded will force the brake shoes 14 outwardly until the brake shoes frictionally engage the inner braking surface of the brake drum 15.

The tube 16 is preferably made from a suitable rubber composition that is reinforced by plies of fabric, and the inner or bottom wall 17 of the tube is made thicker than the outer or upper wall 18 thereof. As shown in the drawings, the inner wall 17 lies against the flange 12 of the channel, while the thinner outer wall 18 bears against the shoes 14.

When the tube is being manufactured, two plies 19 and 20 of open mesh fabric are embedded in the wall 17. These plies of fabric are in the form of sheets which extend transversely of the wall 17, the marginal edges of the fabric terminating in the bights 21 or circumferential edges of the tube. The plies 19 and 20 are embedded in the rubber composition, being preferably disposed adjacent to the surface of the tube which engages the flange 12.

On the other hand, the upper or outer wall 18 of the tube 16 is reinforced with but a single ply of open mesh fabric 22, which is in the form of a sheet that extends transversely of the wall 18. The sheet of fabric 22 is preferably embedded in the rubber composition near the inner surface of the tube, and when the tube is being molded the marginal edges of the fabric 22 are disposed around the bights 21 so as to increase the reinforcement of the portion of the tube engaging the side walls of the said channel.

When the tube is being molded, the wall 18, near the side edges or bights 21, is formed with annular corrugations 23 which are coextensive with the wall. These corrugations increase the surface area of the wall 18 over the normal width of the tube, thereby permitting the wall 18 to expand and contract when fluid pressure is introduced into and withdrawn from the tube 16, without causing a consequent reduction in the normal width of the tube (see Fig. 3).

Therefore, the life of the tube is materially lengthened, because the wall 18 will flex outwardly and inwardly along the corrugations, and not along the marginal edges or bights 21, as would be the case were the extra surface area not formed in the said wall.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An expansible tube of the character specified, comprising a flattened annular body formed from a rubber composition and having opposed inner and outer circumferential walls, the inner wall being thicker than the outer wall, plies of fabric embedded in the opposed walls and extending partially transversely around the body of the tube and overlapping in the edge portions of the tube adjoining the opposed walls, and a groove formed circumferentially of the outer wall adjacent each edge thereof.

2. An expansible tube of the character specified, comprising a flattened annular body formed from a rubber composition and having opposed inner and outer circumferential walls, the inner wall being thicker than the outer wall, a ply of fabric embedded in the outer wall, a plurality of plies of fabric embedded in the inner wall, said plies of fabric extending partially transversely around the body of the tube and overlapping in the edge portions of the tube adjoining the opposed walls, and a circumferential groove formed in the outer wall adjacent to the overlapped plies of fabric.

In testimony whereof I have hereunto set my hand, this 7th day of January, 1929.

SIDNEY G. DOWN.